Patented Jan. 14, 1930

1,743,992

UNITED STATES PATENT OFFICE

ELMER H. STUART, OF INDIANAPOLIS, INDIANA, ASSIGNOR TO ELI LILLY AND COMPANY, OF INDIANAPOLIS, INDIANA, A CORPORATION OF INDIANA

EPHEDRINE OIL SOLUTION

No Drawing.   Application filed February 13, 1929.  Serial No. 339,752.

It is the object of my invention to produce a solution of ephedrine in oil, and more especially in mineral oil (liquid petrolatum).

It is a further object of my invention to produce such a solution of ephedrine in oil, more especially mineral oil, in a form that will be stable under all ordinary conditions; and at the same time to increase the maximum content the solution may have of ephedrine, and thus to make the ephedrine content in the solution larger than would normally be possible in a simple solution in oil under many of those conditions. It is a further object in the preferred forms of my invention to make such a solution otherwise therapeutically effective.

The main purpose for producing such a solution of ephedrine in oil is to make the ephedrine effectively and conveniently applicable in the form of an unctuous nasal spray; and to improve the action of the ephedrine on the mucous membrane, as of the nose, and on the patient generally, by insuring that the ephedrine will be retained on the mucous membrane over a considerable period and that its action will be spread over a greater surface thereof, by prolonging the action of the ephedrine and making its absorption slower but more complete and efficacious, and by protecting the treated mucous membrane (inflammation of which is often the reason for the treatment) during and following the blanching action of ephedrine thereon.

This application is in part a continuation of my co-pending application Serial No. 186,174, filed April 23, 1927; and is directed to the generic invention and to certain subgenuses and a species.

Ephedrine is an alkaloid obtained from the Chinese plant Ma Huang. The alkaloid ephedrine was isolated something over forty years ago, and has been known and to some extent used ever since. The Chinese have known and used the plant Ma Huang for thousands of years—probably about 5000 years—in making decoctions for oral administration as a medicine.

So far as I have been able to discover, no one in all that time has ever made a solution of ephedrine in oil, and more especially a solution of ephedrine in an oil consisting wholly or mainly of mineral oil (liquid petrolatum); although, as stated above, the Chinese plant has been known and used for thousands of years, and even the isolated alkaloid ephedrine has been known for nearly half a century.

Comparative recent pharmacological and clinical study of ephedrine has shown that it has certain physiological as well as chemical similarities to epinephrin; with the added advantage that its action is less sudden in the beginning than is that of epinephrin but continues many times as long.

Ephedrine has been found of decided benefit in the treatment of certain respiratory affections, as of the nose, throat, and associated organs. It and its derivatives are fairly soluble in water, and certain other polar solvents. Water solutions, however, are often undesirable for application to the mucous membrane, as in a nasal spray.

I have discovered that a solution of ephedrine can be made in oil. I have found that such a solution can be made in various oils, such for instance as cottonseed oil; but that a solution of ephedrine with mineral oil (liquid petrolatum) comprising at least the greater part of the solvent or menstruum is especially desirable.

However, ephedrine is difficultly soluble in the various oils ordinarily used as menstruums for nasal sprays, whether such menstruums are mineral oils such as paraffin oils, or vegetable oils such as cottonseed or olive oils. Although occasionally a vegetable oil, such as cottonseed oil, is used as such a menstruum, either by itself or mixed with a mineral oil, and my invention in its broader aspects is applicable to vegetable oils such as cottonseed oil, the oils which are commonly used as such menstruums are almost always in the main some form of mineral oil or liquid petrolatum; and my invention is more especially applicable in its narrower aspects to such mineral oil. It is to such mineral oils which are suitable for menstruums for nasal sprays that I refer herein in using the term "mineral oil." Simple solutions of ephedrine in mineral oil can be made and used for nasal sprays, for ephedrine is slightly soluble in such oil; but this solubility of ephedrine in mineral oil is so slight, especially at the lower temperatures encountered in offices and dwellings, and is so variable with temperature, that such simple solutions of ephedrine in mineral oil are not the most suitable. Such simple solutions are physically unstable at the lower temperatures which are almost certain to be encountered, if the concentration of ephedrine is made sufficient to be therapeutically effective.

For example, a 2% solution (by weight) of ephedrine in light paraffin oil, which is a most desirable form of mineral oil for a nasal spray, can be made by heating and stirring. This can be effectively used if it is prevented from getting cold; but as it is allowed to cool below about 68° F., the ephedrine is precipitated to a greater or less extent, and will return into solution only with difficulty, as by reheating and prolonged shaking. If the temperature is lowered to 32° F., or 0° C., it is found that most of the ephedrine has been precipitated; for I have found that such a light paraffin oil normally has the capacity for holding in solution materially less than one-half (½%) percent of ephedrine at 0° C. Since temperatures of 68° F. and less are quite common, even in offices and homes, and almost inevitable in temperate climates, a simple solution of ephedrine in paraffin oil thus becomes uncertain in value; because when the solution is used it may be that much of the ephedrine will have been precipitated from it, so that the purported solution is so near to being oil alone that it is not therapeutically active. Even though some ephedrine is retained in solution, its amount is problematical; while if the solution has been made sufficiently weak in ephedrine so that there will be no danger of precipitation, the ephedrine content is too small to have any sufficient therapeutic effect.

This difficulty is markedly increased as the concentration of ephedrine is increased; and while 1% and 2% solutions are perhaps most commonly desired, it is sometimes desired to have much higher percentages of ephedrine than the 2% solution just referred to by way of example.

But I have also discovered how it is possible to obtain solutions of ephedrine in oil, and especially in mineral oil, that will maintain the ephedrine in solution in a homogeneous system at all temperatures practically encountered—say even until the temperature is at or even below the freezing point of water, and often even until it is around 10° or 20° F., before cloudiness appears in the solution—and to do this for ephedrine concentrations often as high as 6% and 8%. This makes an ephedrine mineral-oil solution which is entirely practical, instead of one that is impractical under many conditions.

By my invention I can increase the maximum amount of ephedrine which can be held in solution in a fixed vegetable oil, such as cottonseed oil or olive oil; but the principal use of my invention appears to be in connection with solutions of ephedrine in mineral oil.

In addition, I may and desirably do give the ephedrine oil-solution at the same time certain additional properties which are desirable in a nasal spray.

In obtaining these more desirable results, I use in the solution one or more other organic ingredients besides the oil—usually mainly mineral oil—and ephedrine. There are a number of organic ingredients which are capable of accomplishing the desired result, in varying degrees, of holding the ephedrine in solution in the oil even upon lowering of the temperature. Such ingredients or substances all have a greater physical or chemical affinity both for the mineral oil and for the ephedrine than the mineral oil and ephedrine have for each other. Such substances themselves all have the following properties: They are better solvents for ephedrine, either by chemical combination or by simple solution, than is the oil menstruum; they are all themselves materially more soluble in the mineral oil than is ephedrine; and they all form with ephedrine, either by chemical combination or simple solution, a material which is more soluble in the mineral oil than is ephedrine itself.

At least enough of such additional substance or substances should be used to maintain in solution the amount of ephedrine which it is desired the solution shall contain at the lowest temperature that there is danger of encountering. In practice I find that it is usually desirable to provide enough of the additional substance or substances to dissolve or combine with the entire amount of ephedrine which the final oil solution is to contain. The amount needed of the additional substance varies with the substance used, and with the expected minimum temperature. Often this requires between one-half and two molecular equivalents of the amount of ephedrine to be used.

The additional substances which may be used are for the most part comprehended under the class of mono-oxygen derivatives of non-benzenoid. hydrocarbons containing not to exceed eleven carbon atoms.

This fairly general class, which is claimed broadly in this present application as a sub-genus, includes sub-classes;

1. Oil-soluble aldehydes, the combination of which with the oil and ephedrine is specifically claimed in my co-pending application Serial No. 274,965, filed May 3, 1928;

2. Oil-soluble ketones, the combination of which with the oil and ephedrine is specifically claimed in my co-pending application Serial No. 300,946, filed August 20, 1928;

3. Aliphatic alcohols, and

3A. Mono-oxygen terpene-derivatives.

There are some substances which do not fall within this fairly general class of mono-oxygen derivatives of non-benzenoid hydrocarbons containing not to exceed eleven carbon atoms, and yet come under the more generic definitions given herein.

There are also some suitable di-oxygen substances, such as acetals, which come under my broader claims herein but are specifically claimed in my co-pending application Serial No. 362,119, filed May 10, 1929.

Said co-pending applications directed to ketones and aldehydes as the additional substances used with the mineral oil and the ephedrine, also include derivatives of benzenoid hydrocarbons as well as derivatives of non-benzenoid hydrocarbons; as it is found that with the ketones and aldehydes, which appear to combine chemically with the ephedrine to produce compounds which are at once ephedrine-like in their physiological effect and more freely soluble in the mineral oil than is the ephedrine itself, the action is not limited to non-benzenoid compounds.

The present application is directed not only to the generic and sub-generic classes outlined herein, but also is directed more specifically to alcohols, especially non-benzenoid alcohols, which exclude the ketones and aldehydes; and is directed still more specifically to the mono-oxygen terpene-derivatives as the additional substance or substances used.

Another general broad classification for the additional substances may be given in terms of polarity, as that term is used in connection with solvents and solutions. The additional substances used are all of an intermediate polarity. The mineral oil used is a substance of low polarity; as distinguished from water, which is rather highly polar. Ephedrine is of sufficiently high polarity to be fairly soluble in highly polar solvents, such as water; but I have found that while it is soluble to some extent in solvents of low polarity, such as mineral oil, it is rather difficultly soluble therein. The additional substance or substances used have an intermediate polarity between that of oil and that of ephedrine; and are sufficiently non-polar to dissolve in the mineral oil, in the amounts in which they are used, to form a homogeneous system, but are sufficiently polar so that they readily dissolve the ephedrine.

Among the additional substances I have found to be effective in thus producing the stable solutions of ephedrine in mineral oil are the following:

| | |
|---|---|
| Menthol. | Ethyl methyl ketone. |
| Camphor. | Ethyl propyl ketone. |
| Thymol. | Menthone. |
| Oil of thyme. | Oil of citronella. |
| D-borneol. | Geraniol. |
| Eucalyptol. | Turpineol. |
| Methyl alcohol. | Oil of pine. |
| Ethyl alcohol. | Ethyl ether. |
| N-propyl alcohol. | Tertiary butyl acetal. |
| Iso-propyl alcohol. | Acetal. |
| N-butyl alcohol. | Cinnamic aldehyde. |
| N-amyl alcohol. | Benz-aldehyde. |
| N-hexyl alcohol. | Formaldehyde. |
| N-heptyl alcohol. | Acetaldehyde. |
| N-octyl alcohol. | Phenylacetaldehyde. |
| N-nonyl alcohol. | Heptaldehyde. |
| Methyl hexyl carbinol. | Anisaldehyde. |
| Di-n-propyl carbinol. | Furfur aldehyde. |
| Tertiary butyl alcohol. | Vetratraldehyde. |
| Iso-butyl alcohol. | Salicylaldehyde. |
| Iso-amyl alcohol. | Citral. |
| Tertiary amyl alcohol. | O-methoxy-benzaldehyde. |
| Acetone. | Citronellal. |
| Acetophenone. | |

When mineral oil such as light paraffin oil is used as the menstruum, I have found that a vegetable oil such as cottonseed oil can be used very satisfactorily as the additional substance to help maintain the ephedrine in solution.

One solution which has been found to be very effective and pleasant, and which I give as an example, is a 1% to 2% solution of ephedrine in light paraffin oil which also contains one or two or three of the substances menthol, camphor, and oil of thyme; desirably in such proportions that there is between one-half and two mols of such additional substance or substances (taken together if more than one is used) to one mol of ephedrine.

Thus, for instance, (as as example only,) using both camphor and menthol, if there is 2% of ephedrine in terms of the amount of paraffin oil used, I prefer to use about 0.95% each of methol and camphor (although these figures are only approximate). That makes substantially one mol of menthol and camphor, taken together, to one mol of ephedrine.

The camphor, menthol, and/or oil of thyme may be used, however, in greater or less amounts than the molecular equivalent proportions named, as to produce their own individual therapeutic effects; and need not be in equivalent or equal amounts as between themselves.

The substances menthol, camphor, and oil of thyme are used in the example just given because they are substantially non-toxic to the system, non-irritating to the mucous membrane in the quantities in which they are used, and produce pleasant effects on the mucous membrance.

The solutions which have been given above as examples are physically stable until relatively low temperatures are reached. For instance, using one mol of menthol to one mol of ephedrine, the solution remains stable and unclouded until the temperature is lowered to the freezing point of water, and even until it is lowered as low as 10° F., for ephedrine concentrations ranging from ½% to 8%. These temperatures are lower than those usually encountered in homes and business offices, where it is rare that temperatures below the freezing point of water are encountered; so that solutions thus prepared of ephedrine in mineral oil may be counted on to retain the full amount of ephedrine in solution under all conditions ordinarily encountered. Further, if the temperature should be lowered to such a point that the ephedrine is precipitated, the solution is too cold to be used theropeutically; and upon warming to a temperature suitable for use, the ephedrine returns into solution, often even without the aid of shaking although sometimes slight shaking is desirable instead of requiring it to be heated to temperatures higher than the normal temperatures encountered in the home or office.

I claim:

1. A solution of ephedrine in oil, comprising mineral oil, ephedrine as one substance dissolved therein, and at least one additional organic substance which is also dissolved in the mineral oil and is itself a better solvent for ephedrine than is the mineral oil and is more soluble in the mineral oil to form a homogeneous system than is the ephedrine.

2. A solution of ephedrine in oil, comprising mineral oil, ephedrine as one substance dissolved therein, and at least one additional substance which is also dissolved in said mineral oil and helps to maintain the ephedrine in solution, said additional substance being a mono-oxygen derivative of a non-benezenoid hydrocarbon and being more soluble in the mineral oil than is the ephedrine.

3. A solution of ephedrine in oil, comprising mineral oil, ephedrine as one substance dissolved therein, and a non-benzenoid alcohol which is also dissolved in said mineral oil and is more soluble in the mineral oil than is the ephedrine and helps to maintain the ephedrine in solution.

4. A solution of ephedrine in oil, comprising mineral oil, ephedrine as one substance dissolved therein, and a mono-oxygen terpene-derivative which is also dissolved in said mineral oil and is more soluble in the mineral oil than is the ephedrine and helps to maintain the ephedrine in solution.

5. A nasal spray consisting in a solution of ephedrine, comprising mineral oil as a menstruum, and ephedrine dissolved therein.

6. A nasal spray consisting in a solution of ephedrine, comprising oil as a menstruum, and ephedrine dissolved therein.

7. A solution of ephedrine in oil; comprising a mineral oil, ephedrine as one substance dissolved therein, and at least one substance of the class made up of menthol, camphor, and oil of thyme also dissolved in the mineral oil.

8. A solution of ephedrine in oil; comprising an oil, ephedrine as one substance dissolved therein, and at least one substance of the class made up of menthol, camphor, and oil of thyme also dissolved in the oil.

9. A solution of ephedrine in mineral oil, which contains at least one-half (½%) per cent of ephedrine by weight and which holds the ephedrine in stable solution at temperatures as low as the freezing point of water.

10. A solution of ephedrine in oil, which contains at least one-half (½%) per cent of ephedrine by weight and which holds the ephedrine in stable solution at temperatures as low as the freezing point of water.

11. A solution of ephedrine in oil, comprising oil suitable for a menstruum for a nasal spray, ephedrine as one substance dissolved therein, and at least one additonal organic substance which is also dissolved in the oil and is itself a better solvent for ephedrine than is the oil and is more soluble in the oil to form a homogeneous system than is the ephedrine.

12. A solution of ephedrine in oil, comprising mineral oil, ephedrine as one substance dissolved therein, and at least one additional substance which is also dissolved in said mineral oil and helps to maintain the ephedrine in solution, said additional substance being a mono-oxygen derivative of a non-benzenoid hydrocarbon containing not to exceed eleven carbon atoms and being more soluble in the mineral oil than is the ephedrine.

13. A solution of ephedrine in oil, comprising mineral oil, ephedrine as one substance dissolved therein, and an alcohol which is also dissolved in said mineral oil and is more soluble in the mineral oil than is the ephedrine and helps to maintain the ephedrine in solution.

14. A solution of ephedrine in oil, comprising a mineral oil, ephedrine as one substance dissolved therein, and an organic substance which is also dissolved in the mineral oil and which has the properties of being a better solvent for ephedrine than is the mineral oil, and of forming with the ephedrine a material which is more soluble in the mineral oil than is the ephedrine itself.

15. A solution of ephedrine in oil, comprising a mineral oil, ephedrine as one substance dissolved therein, and an organic substance which is also dissolved in the mineral oil and which has the properties of being more soluble in the mineral oil to form a homogeneous system than is the ephedrine, of being a better solvent for ephedrine than is the mineral oil, and of forming with the ephedrine a material which is more soluble in the mineral oil than is the ephedrine itself.

16. A solution of ephedrine in oil, comprising an oil suitable for a menstruum for a nasal spray, ephedrine as one substance dissolved therein, and an organic substance which is also dissolved in the oil and which has the properties of being a better solvent for ephedrine than is the oil, and of forming with the ephedrine a material which is more soluble in the oil than is the ephedrine itself.

17. A solution of ephedrine in oil, comprising an oil suitable for a menstruum for a nasal spray, ephedrine as one substance dissolved therein, and an organic substance which is also dissolved in the oil and which has the properties of being more soluble in the oil to form a homogeneous system than is the ephedrine, of being a better solvent for ephedrine than is the oil, and of forming with the ephedrine a material which is more soluble in the oil than is the ephedrine itself.

18. A nasal spray consisting in a solution of ephedrine, comprising a menstruum consisting at least mainly of paraffin oil, and ephedrine dissolved therein.

19. A solution of ephedrine in oil, comprising mineral oil, ephedrine as one substance dissolved therein, and at least one additional organic substance which is also dissolved in the mineral oil and which has a greater physical or chemical affinity both for the oil and for the ephedrine than they have for each other.

20. A solution of ephedrine in mineral oil, which contains at least one-half per cent (½%) of ephedrine by weight and which holds the ephedrine in stable solution at temperatures as low as the freezing point of water, the mineral oil being a light paraffin oil.

21. A solution of ephedrine in oil; comprising a mineral oil, and ephedrine and menthol dissolved therein.

22. A solution of ephedrine in oil; comprising an oil, and ephedrine and menthol dissolved therein.

23. A solution of ephedrine in oil, comprising a mineral oil, ephedrine as one substance dissolved therein, menthol as another substance dissolved therein, and at least one substance of the class made up of camphor and oil of thyme also dissolved in the mineral oil 24. A solution of ephedrine in oil, comprising an oil, ephedrine as one substance dissolved therein, menthol as another substance dissolved therein, and at least one substance of the class made up of camphor and oil of thyme also dissolved in the mineral oil.

In witness whereof, I have hereunto set my hand at Indianapolis, Indiana, this sixth day of February, A. D. one thousand nine hundred and twenty-nine.

ELMER H. STUART.